United States Patent
Cabillic et al.

(10) Patent No.: US 7,752,610 B2
(45) Date of Patent: Jul. 6, 2010

(54) METHOD AND SYSTEM FOR THREAD ABSTRACTION

(75) Inventors: Gilbert Cabillic, Brece (FR); Jean-Philippe Lesot, Etrelles (FR)

(73) Assignee: Texas Instruments Incorporated, Dallas, TX (US)

( * ) Notice: Subject to any disclaimer, the term of this patent is extended or adjusted under 35 U.S.C. 154(b) by 1065 days.

(21) Appl. No.: 11/189,637

(22) Filed: Jul. 26, 2005

(65) Prior Publication Data

US 2006/0026566 A1 Feb. 2, 2006

(30) Foreign Application Priority Data

Jul. 27, 2004 (EP) .................................. 04291918

(51) Int. Cl.
*G06F 9/44* (2006.01)
*G06F 9/45* (2006.01)

(52) U.S. Cl. ....................... 717/148; 717/127; 717/153; 717/154

(58) Field of Classification Search ....................... None
See application file for complete search history.

(56) References Cited

U.S. PATENT DOCUMENTS

| | | | |
|---|---|---|---|
| 6,003,038 A | 12/1999 | Chen | |
| 6,240,440 B1 * | 5/2001 | Kutcher | 718/102 |
| 6,374,286 B1 | 4/2002 | Gee et al. | |
| 6,438,573 B1 * | 8/2002 | Nilsen | 718/100 |
| 6,510,352 B1 | 1/2003 | Badavas et al. | |
| 6,519,594 B1 * | 2/2003 | Li | 707/10 |
| 6,615,342 B1 | 9/2003 | Bopardikar et al. | |
| 6,711,739 B1 * | 3/2004 | Kutcher | 718/1 |
| 6,738,846 B1 * | 5/2004 | Slaughter et al. | 710/260 |
| 6,854,113 B1 | 2/2005 | Sankar et al. | |
| 6,862,650 B1 | 3/2005 | Matthews et al. | |

(Continued)

OTHER PUBLICATIONS

Vanderburg, Glenn L. et al., Tricks of the Java Programming Gurus, "Effective Use of Threads," online at: http://docs.rinet.ru/JaTricks/ch6.htm.

(Continued)

*Primary Examiner*—Chuck O Kendall
(74) *Attorney, Agent, or Firm*—Ronald O. Neerings; Wade James Brady, III; Frederick J. Telecky, Jr.

(57) ABSTRACT

Systems, methods, and computer-readable media supporting thread abstraction in Java are provided. In some illustrative embodiments, a system is provided that includes a Java execution flow class that represents an execution flow context, an execution flow scheduler object including a Java native execution flow activation method, a Java virtual machine, a Java scheduler that executes on the Java virtual machine, and a Java thread class that extends the execution flow class. The execution flow class includes an execution flow execution method and a constructor that creates an execution flow context. The Java thread class includes an execution flow execution method that overrides the execution flow execution method of the execution flow class. In this system, a thread object including one or more instructions of a thread is instantiated using a custom thread class that extends the Java thread class, the constructor creates an execution flow context for the thread, and the Java scheduler invokes the execution flow activation method to switch from a currently executing execution flow context to the thread execution flow context to execute the one or more instructions.

26 Claims, 4 Drawing Sheets

U.S. PATENT DOCUMENTS

| | | | |
|---|---|---|---|
| 7,003,778 | B2 | 2/2006 | Sokolov |
| 7,039,738 | B2 | 5/2006 | Plummer et al. |
| 7,380,039 | B2 | 5/2008 | Miloushev et al. |
| 7,383,550 | B2 | 6/2008 | Challenger et al. |
| 7,461,386 | B2 | 12/2008 | Schwabe et al. |
| 2002/0032719 | A1 | 3/2002 | Thomas et al. |
| 2002/0042807 | A1 | 4/2002 | Thomas et al. |
| 2005/0028155 | A1 | 2/2005 | Jung |
| 2006/0026565 | A1* | 2/2006 | Cabillic et al. .............. 717/118 |
| 2006/0053422 | A1 | 3/2006 | Alikacem et al. |

OTHER PUBLICATIONS

Hewlett Packard, "Threads and the Java Virtual Machine," online at http://h21007.www2.hp.com/dspp/tech/tech_TechDocumentDetailPage_IDX/1,1701,390,00.html.

Sun Microsystems, Inc., "Compiling for the Java Virtual Machine," online at: http://java.sun.com/docs/books/vmspec/2nd-edition/html/Compiling.doc.html, copyright 1999.

Sun Microsystems, Inc., "Class Thread" online at: http://java.sun.com/j2se/1.5.0/docs/api/java/lang/Thread.html, copyright 2004.

Sun Microsystems, Inc., "Lesson: Threads: Doing Two or More Tasks At Once," online at: http://java.sun.com/docs/books/tutorial/essential/threads/index.html, copyright 2005.

Sun Microsystems, Inc., "What Is a Thread?," online at: http://java.sun.com/docs/books/tutorial/essential/threads/definition.html, copyright 2005.

Sun Microsystems, Inc., "Using the Timer and TimerTask Classes," online at: http://java.sun.com/docs/books/tutorial/essential/threads/timer.html, copyright 2005.

Sun Microsystems, Inc., "Implementing a Thread," online at: http://java.sun.com/docs/books/tutorial/essential/threads/customizing.html, copyright 2005.

Sun Microsystems, Inc., "Subclassing Thread and Overriding Run," online at: http://java.sun.com/docs/books/tutorial/essential/threads/simple.html, copyright 2005.

Sun Microsystems, Inc., "Implementing the Runnable Interface," online at: http://java.sun.com/docs/books/tutorial/essential/threads/clock.html, copyright 2005.

* cited by examiner

*FIG. 3*

| 1 | public class Thread extends ExecutionFlow |
|---|---|
| 2 | { |
| 3 |   void scheduleMe() |
| 4 |   { |
| 5 |     ExecutionFlowScheduler.setEFActive(this); |
| 6 |   } |
| 7 |  |
| 8 |   public void run() |
| 9 |  |
| 10 |   { |
| 11 |     //Code for thread, overrides the run method of the ExecutionFlow class |
| 12 |   } |
| 13 | } |
| 14 |  |
| 15 | public class ExecutionFlow |
| 16 | { |
| 17 |   public void run() |
| 18 |   { |
| 19 |     //must be overriden by a subclass |
| 20 |   } |
| 21 |  |
| 22 |   public ExecutionFlow() |
| 23 |   { |
| 24 |     ExecutionFlowCreate(); |
| 25 |   } |
| 26 |  |
| 27 |   public final native int ExecutionFlowCreate (); |
| 28 |   public final native int ExecutionFlowDestroy (); |
| 29 |   public void monitorEnter (Objectref); |
| 30 |   public void monitorExit(Objectref); |
| 31 | } |

FIG. 5

| 1 | public class KeyboardDriver extends KeyboardInterrupt |
|---|---|
| 2 | { |
| 3 |    public void handler(){ |
| 4 |      //Java keyboard driver handler code, overrides handler method |
| 5 |      of KeyboardInterrupt class |
| 6 |    } |
| 7 | } |
| 8 | |
| 9 | public class KeyboardInterrupt extends ExecutionFlow |
| 10 | { |
| 11 |    public final void run() |
| 12 |    { |
| 13 |      while(1==1){ |
| 14 |        handler(); |
| 15 |        endOfInterrupt(); |
| 16 |      } |
| 17 | |
| 18 |    public void handler(){}; |
| 19 |    public final native void endOfInterrupt(); |
| 20 | } |

METHOD AND SYSTEM FOR THREAD ABSTRACTION

CROSS-REFERENCE TO RELATED APPLICATIONS

This application claims the benefit of European Patent Application No. 04291918.3, filed Jul. 27, 2004, incorporated by reference herein as if reproduced in full below. This application is related to co-pending and commonly assigned application Ser. No. 11/189,422, entitled, "Method And System For Implementing An Interrupt Handler" which is incorporated by reference herein.

BACKGROUND OF THE INVENTION

Mobile electronic devices such as personal digital assistants (PDAs) and digital cellular telephones are increasingly including applications written in the Java™ programming language. Many of these mobile devices include operating systems written in programming languages other than Java. To increase system stability, it would be desirable to implement all or part of the operating system, such as a high-level thread scheduler or interrupt handlers, using the Java programming language.

A thread may be generically defined as an independent flow of control or stream of execution within an executing application. A thread may include a context (e.g., a program counter and a register set) and an instruction sequence that can be executed independently of other instruction sequences. The Java programming language specification provides a thread API, java.lang.Thread, that may be used to implement multiple threads of execution within a Java program, and imposes a minimum priority-based thread scheduling policy on implementations of the Java Virtual Machine ("JVM"). In many JVM implementations, Java threads are implemented on the native threading model of a non-Java operating system and the scheduler of the operating system controls the scheduling of the Java threads.

In addition, the concept of an interrupt is not supported by the Java programming language and standard JVM implementations. Some implementations provide non-standard native application program interfaces ("APIs") to the interrupt handling capabilities of an underlying non-Java operating system. Enhancements to permit thread schedulers and interrupt handling to be implemented in the Java programming language are desirable.

SUMMARY

Accordingly, there are disclosed herein systems, methods and computer-readable media for thread abstraction in Java. Some embodiments provide a system that includes a Java execution flow class that represents an execution flow context, an execution flow scheduler object including a Java native execution flow activation method, a Java virtual machine, a Java scheduler that executes on the Java virtual machine, and a Java thread class that extends the execution flow class. The execution flow class includes an execution flow execution method and a constructor that creates an execution flow context. The Java thread class comprises an execution flow execution method that overrides the execution flow execution method of the execution flow class. In this system, a thread object comprising one or more instructions of a thread is instantiated using a custom thread class that extends the Java thread class, the constructor creates an execution flow context for the thread, and the Java scheduler invokes the execution flow activation method to switch from a currently executing execution flow context to the thread execution flow context to execute the one or more instructions.

Some embodiments provide a method for executing a thread in a Java application. This method includes instantiating an object comprising one or more instructions of the thread using a thread class that extends an execution flow class, wherein an execution flow context for the thread is created. The method also includes invoking a Java native execution flow activation method comprised in an execution flow scheduler object to switch from a currently executing execution flow context to the thread execution flow context.

Some embodiments provide a computer-readable medium that stores a Java software system that when executed by a processor performs the above-described method. Other embodiments provide a system that comprises a processor and a Java software system configured to execute on the processor. The Java software system comprises a Java virtual machine and is configured to perform the above-described method.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". Also, the term "couple" or "couples" is intended to mean either an indirect or direct connection. Thus, if a first component couples to a second component, that connection may be through a direct connection, or through an indirect connection via other components and connections.

BRIEF DESCRIPTION OF THE DRAWINGS

For a more detailed description of the preferred embodiments of the present invention, reference will now be made to the accompanying drawings, wherein:

FIGS. 3 and 5 show Java source code examples in accordance with embodiments of the invention.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

The subject matter disclosed herein is directed to systems, methods, and computer-readable media that include an abstraction of an execution flow context and an execution flow scheduler. This execution flow context abstraction, implemented as a Java class, provides a Java API for the execution flow context implemented in a low-level runtime system (e.g., native operating system threads or basic processor register contexts). The execution flow class and the execution flow scheduler enable the implementation of high-level thread schedulers and interrupt handling in Java.

Merely by way of example, the embodiments described herein are directed to a Java Virtual Machine implemented on a system comprising a Java processor referred to herein as a Java Stack Machine and a general purpose processor. These embodiments should not be construed as limitations of the scope of this disclosure. The methods described are applicable to implementations of the Java Virtual Machine on other systems.

Figure 1:
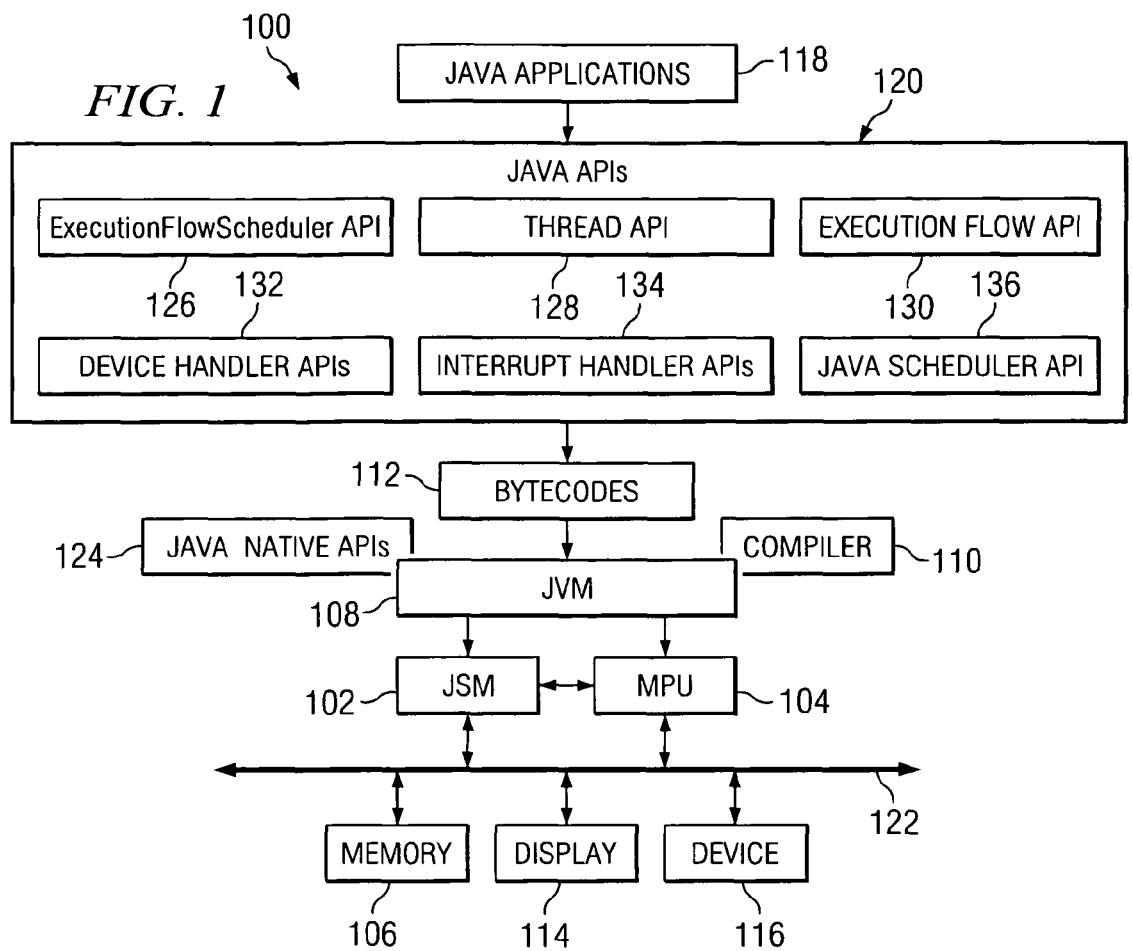
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106, a display 114, and a device 116 coupled to both the JSM 102 and MPU 104 via one or more busses 122. At least a portion of the memory 106 may be shared by both processors, and if desired, other portions of the memory 106 may be designated as private to one processor or the other. Other components such as disk drives and controllers (not specifically shown) may be included as desired for various applications.

System 100 also comprises Java system software that includes a Java Virtual Machine ("JVM") 108, compiler 110, Java APIs 120, and Java native APIs 124, and Java applications 118 that execute on the Java system software. The JVM 108 may comprise a class loader, bytecode verifier, garbage collector, and a bytecode interpreter loop to interpret the bytecodes that are not executed on the JSM processor 102. The Java applications 118 are written in Java language source code and may comprise references to one or more classes of the Java Application Program Interfaces ("APIs") 120 and the Java native APIs 124. The Java native APIs 124 comprise interfaces to classes and methods implemented in other languages such as C++, C or assembler.

The Java source code is converted or compiled to a series of bytecodes 112, with each individual one of the bytecodes referred to as an "opcode." Bytecodes 112 are provided to the JVM 108, possibly compiled by compiler 110, and provided to the JSM 102 and/or MPU 104 for execution. In some embodiments, the JSM 102 may execute at least some Java bytecodes directly. When appropriate, however, the JVM 108 may also request the MPU 104 to execute one or more Java bytecodes not executed or executable by the JSM 102. In addition to executing compiled Java bytecodes, the MPU 104 also may execute non-Java instructions.

The system 100 may host an operating system (not specifically shown) written in Java which performs various functions such as virtual memory management, thread scheduling, management of the display 114, and handling interrupts from various devices 116. As is described in more detail herein, the scheduler (represented by the Java scheduler API 136) and the interrupt handlers (represented by the device handler API 132) are based on an abstraction of an execution flow context of an underlying run-time system and an execution flow scheduler.

Java bytecodes perform stack-based operations. For example, an "IADD" (integer add) Java opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java bytecodes, a second instruction set other than Java bytecodes. In some embodiments, the second instruction set may comprise register-based and memory-based operations rather than stack-based operations. This second instruction set complements the Java instruction set and, accordingly, may be referred to as a complementary instruction set architecture ("C-ISA"). By complementary, it is meant that some complex Java bytecodes may be replaced by a "micro-sequence" comprising C-ISA instructions. The execution of Java code may thus be made more efficient and run faster by replacing some opcodes with more efficient micro-sequences of C-ISA instructions. For example, the compiler 110 may scan a series of Java bytes codes and replace one or more of such bytecodes with an optimized code segment mixing CISA and bytecodes and which is capable of more efficiently performing the function(s) performed by the initial group of Java bytecodes. In at least this way, Java execution may be accelerated by the JSM 102.

The Java APIs 120 include a Java scheduler API 136, an execution flow scheduler API 126, a thread API 128, an execution flow API 130, device handler APIs 132, and interrupt handler APIs 134. The execution flow API 130 is presented by an execution flow class that abstracts the execution flow context of the underlying low-level runtime of the system 100. An example implementation of an execution flow class is shown in FIG. 3. One of ordinary skill will appreciate that this code sequence is presented by way of example only and other implementations are possible and fall within the scope of this disclosure. Functionality comprised in an execution flow class is explained below with reference to this example implementation.

This execution flow class is designed to be extended, i.e., subclassed. As such, the execution flow API 130 includes a method to be invoked by the JVM 108 to execute the instructions of an execution flow, i.e., an execution flow execution method (lines 17-20). Note that the execution flow execution method is entitled "run" in the example and is referred to as a "run method" herein. This run method must be overridden by any class extending the execution flow class to provide an implementation that comprises the instructions.

The execution flow class may also include a constructor that creates a native execution flow context when an object of subclass of the execution flow class is instantiated (lines 22-25). The constructor calls a native method to create the native execution flow context (i.e., an execution flow creation method). In other embodiments, the native execution flow context may be created after the object is instantiated by an invocation of a native method that creates the execution flow context (e.g., line 27).

Generally, when an object instantiated in the memory 106 of the system 100 is no longer needed, the memory allocated to that object is freed up for reuse (i.e., destroyed) by the garbage collector in the JVM 108. Therefore, an object of a subclass of the execution flow class that is no longer needed is eventually destroyed by the garbage collector. However, in some embodiments of the system 100, the low-level runtime may provide a predetermined, static number of execution flow contexts. In such embodiments, the execution flow class may include a native method that may be invoked to indicate to the low-level runtime that an object of a subclass of the execution flow class is no longer using an execution flow context (i.e., an execution flow destruction method) (line 28). This allows the execution flow context to be re-used even if the garbage collector has not yet destroyed the object.

As is explained in more detail below, threads of the Java applications and the Java operating system are implemented as subclasses of the execution flow class. In a multi-processor system such as the system 100, multiple threads may run simultaneously. The possibility exists that two threads may access the same data simultaneously or one thread may attempt to retrieve data that has not yet been provided by another thread. Therefore, a mechanism is needed to synchronize thread execution to enable if multiple threads are sharing data, only one may access that data at any given time during execution.

The JVM 108 implements thread synchronization as specified the standard Java language specification and the Java virtual machine specification. Each Java object is allocated a monitor when the object is created. If a method of an object or a code segment of a method is implemented using the Java keyword "synchronized," the JVM 108 uses the monitor to control access to the synchronized method or code segment. When the synchronized method or code segment is to be executed by a thread, the thread acquires the monitor while executing the method or code segment. After the method or code segment is executed, the thread releases the monitor. A thread that attempts to execute a synchronized method or code segment of an object whose monitor is taken by another thread is required to wait until that thread releases the monitor.

The execution flow class includes a method that may be invoked by the JVM 108 to notify the Java thread scheduler that a currently executing thread has attempted to execute a synchronized method or code segment of an object whose monitor is taken (i.e., a monitor enter method) (line 29). Upon receiving such notification, the Java thread scheduler may halt the execution of the current thread and place it in a queue to wait for the monitor to be released. The execution flow class also includes a method that may be invoked by the JVM 108 to notify the Java operating system that a monitor has been released. Upon receiving such notification, the Java operating system may reschedule any threads that are waiting for the monitor to be released.

The execution flow scheduler API 136 is presented by a Java execution flow scheduler class. The execution flow scheduler class includes a Java native method that may be invoked to cause the low-level runtime to perform a context switch (i.e., an execution flow activation method). The context switch halts execution of the currently executing execution flow and saves its context. The context switch then restores and activates an execution flow context specified by the execution flow activation method. The Java system software of the system 100 includes a single execution flow scheduler object created using this class.

The thread API 128 is presented by a thread class. An example implementation of thread class is shown in FIG. 3. One of ordinary skill will appreciate that this code sequence is presented by way of example only and other implementations are possible and fall within the scope of this disclosure. Functionality comprised in a thread class is explained below with reference to this example implementation.

The thread class extends the execution flow class and is designed to be extended, i.e., subclassed, by a Java application to create custom thread classes representing threads of the application. The thread API 128 includes a method to be invoked by the JVM 108 to execute the instructions of a thread, i.e., a run method (lines 8-12). In some embodiments, this run method must be overridden by a custom thread class extending the thread class to provide an implementation that comprises the instructions of the thread. In other embodiments, the run method of the thread class includes an instruction sequence that causes a thread instruction sequence of a custom thread class to be executed.

In at least one embodiment, the thread class includes a scheduling method that may be called by the Java operating system to cause a thread to be activated (lines 3- 6). This scheduling method includes instructions to invoke the execution flow activation method of the execution flow scheduler API 126 to activate an execution flow context of a thread defined by a custom thread class.

In various embodiments, the thread API 128 may comprise additional methods and instance variables that are used by the Java thread scheduler to manage threads. For example, the thread class may include methods to suspend the execution of a thread, to set the priority of a thread, to resume a thread, etc.

The Java scheduler API 136 is presented by a Java thread scheduler. Embodiments of the Java thread scheduler implement a high-level thread scheduling policy (e.g., round robin, priority-based, and/or negotiated multimedia). In some embodiments, additional methods and instance variables included in the thread API 128 are determined, at least in part, by the thread scheduling policy of the Java thread scheduler.

Figure 2A:
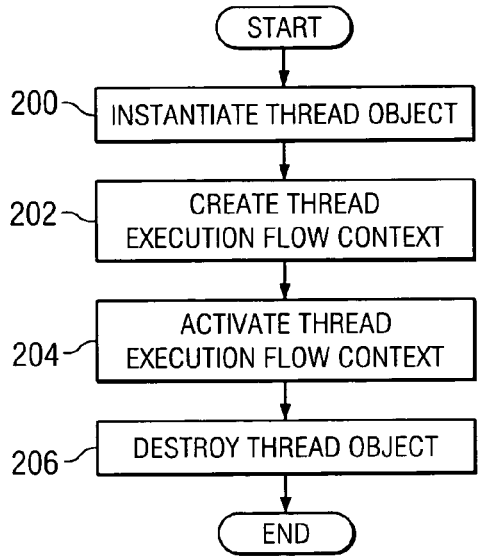
FIGS. 2A, 2B, and 4 show flow diagrams of methods in accordance with embodiments of the invention.
Figure 2B:
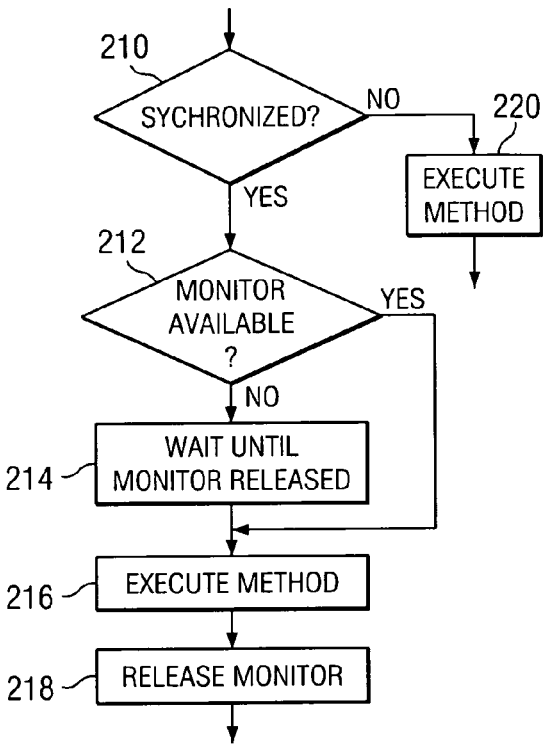

FIGS. 2A and 2B show flow diagrams of a method for executing a thread in accordance with embodiments of the invention. Although the actions of this method are presented and described serially, one of ordinary skill in the art will appreciate that the order may differ and/or some of the actions may occur in parallel. A Java application of the Java applications 108 creates a thread by instantiating a thread object using a custom thread class that extends the thread class (block 200). The custom thread class may include a run method, the implementation of which defines the thread instructions to be executed. These thread instructions may include invocations of synchronized methods and/or synchronized code segment.

When the thread object is instantiated, the constructor of the execution flow class is called to create the execution flow context for the thread (block 202). The thread is then available to be scheduled by the Java thread scheduler according to the scheduling policy of the scheduler. When the scheduler determines that the execution of the thread may be initiated or resumed, the scheduler calls the scheduling method of the thread object to activate the execution flow context of the thread (block 204). This scheduling method, in turn, calls the execution flow activation method of the execution flow scheduler object to perform the context switch. After the context switch, the JVM 108 executes the instructions of the thread. If the thread is being initiated, the JVM 108 calls the run method of the thread object to start the execution of the thread instructions.

If the thread attempts to execute a synchronized method or a synchronized code segment in an object whose monitor is taken (blocks 210 and 212), the JVM 108 calls a monitor enter method to notify the Java thread scheduler that the thread is blocked. The Java thread scheduler selects the next thread to be executed, restores and activates its execution flow context, and places the blocked thread in a wait queue until the object's monitor is released (block 214). When the monitor is released, the JVM 108 calls a monitor exit method to notify the Java thread scheduler that the monitor has been released. The Java thread scheduler then takes the blocked thread out of the wait queue and schedules it for execution according to the scheduling policy of the scheduler (block 216). Prior to executing the synchronized method or code segment, the thread obtains the monitor of the object. After the method or code segment is executed, the thread releases the monitor (block 218). If a method or code segment to be executed by the thread is not synchronized (block 210), the thread is allowed to execute the method or code segment without obtaining the monitor (block 220).

Once the thread has completed execution, the thread object is no longer needed and may be destroyed by the garbage collector (block 206). In some embodiments, the Java thread scheduler may call the execution flow destruction method of the thread object to indicate that the execution flow context used by the thread object may be re-used.

The interrupt handler APIs 134 are presented by interrupt handler classes. The JVM 108 includes a native interrupt handler for each interrupt that may be generated by devices in the system (e.g., device 116). An interrupt handler class is associated with each native interrupt handler in the JVM 108. An example implementation of an interrupt handler class associated with a native keyboard interrupt is shown in FIG. 5 (lines 9-20). One of ordinary skill will appreciate that this code sequence is presented by way of example only and other implementations are possible and fall within the scope of this disclosure. Functionality comprised in an interrupt handler class is explained below with reference to this example implementation.

The keyboard interrupt class extends the execution flow class and may be designed to be extended, i.e., subclassed, to create a keyboard driver class containing the Java implementation of a keyboard interrupt handler. The keyboard interrupt class includes a method to be invoked to execute the instructions of a keyboard interrupt handler, i.e., a handler method (line 18). This handler method may be overridden by the keyboard driver class extending the keyboard interrupt class to provide an implementation that comprises the instructions of the handler. In other embodiments, the instructions that comprise the keyboard interrupt handler may be implemented in the keyboard interrupt class.

In some embodiments, the keyboard interrupt class also includes a native interrupt termination method (line 19). This interrupt termination method is designed to be called after the keyboard interrupt handler is executed in response to a keyboard interrupt. The interrupt termination method causes the keyboard interrupt to be enabled and the execution flow context that was executing prior to the keyboard interrupt to be restored. In addition, the keyboard interrupt class includes a run method that overrides the run method of the execution flow class (lines 11-16). This run method is invoked by the JVM 108 to execute the instructions of the handler method.

In the example of FIG. 5, the run method is designed to avoid the need to invoke the run method and the handler method each time a keyboard interrupt occurs. Note that the first time the run method is called, it enters an infinite loop (line 13). In this loop, the handler method is invoked. Once the handler method has been executed, the interrupt termination method is invoked. The interrupt termination method causes a context switch, leaving the execution flow context of the keyboard interrupt handler in a state where the handler may be executed the next time the execution flow context is activated. In other embodiments, the run method may be designed such that it and the handler method must be invoked each time a keyboard interrupt occurs.

The device handler APIs 132 are presented by device driver classes. A device driver class may be provided for one or more of the interrupt handler classes. An example implementation of a keyboard driver class implementing a keyboard interrupt handler is shown in FIG. 5 (lines 1-7). One of ordinary skill will appreciate that this code sequence is presented by way of example only and other implementations are possible and fall within the scope of this disclosure. Functionality comprised in a device driver class is explained below with reference to this example implementation.

The keyboard driver class extends the keyboard interrupt class. The keyboard driver class includes a handler method that comprises the instructions to be executed to handle a keyboard interrupt. This handler method overrides the handler method of the keyboard interrupt class.

Figure 4:
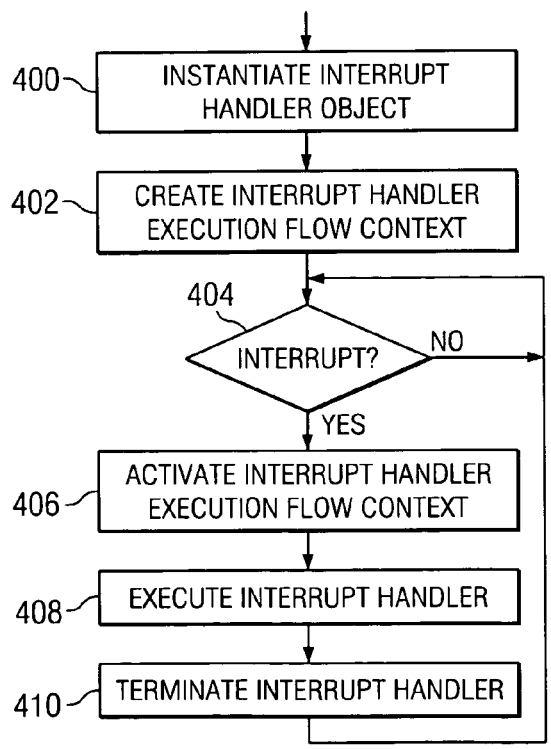

FIG. 4 shows a flow diagram of a method for handling an interrupt in accordance with embodiments of the invention. Although the actions of this method are presented and described serially, one of ordinary skill in the art will appreciate that the order may differ and/or some of the actions may occur in parallel. An interrupt handler object is instantiated (block 400). In some embodiments, the interrupt handler object is instantiated using an interrupt handler class that is associated with a native interrupt handler for a device. The interrupt handler class extends an execution flow class and includes a handler method containing code to handle an interrupt. In other embodiments, the interrupt handler object is instantiated using a device driver class that extends the interrupt handler class and includes a handler method that overrides the handler method of the interrupt handler class. When the interrupt handler object is instantiated, the constructor of the execution flow class is called to create an execution flow context for the interrupt handler (block 402).

When a device interrupt occurs (block 404), the native device interrupt handler calls the JVM 108. The JVM 108 invokes the execution flow activation method of the execution flow scheduler object to activate the execution flow context of the interrupt handler (block 406). The handler method is executed (block 408) and the interrupt termination method is called to enable the interrupt and to cause a context switch to another execution flow context (block 410). Unlike the previously explained thread execution method, the handler object is not destroyed. The execution flow context of the handler is left in a state such that it may be activated by the JVM 108 when the next device interrupt occurs without the overhead of invoking the run and handler methods of the device handler object.

Figure 6:
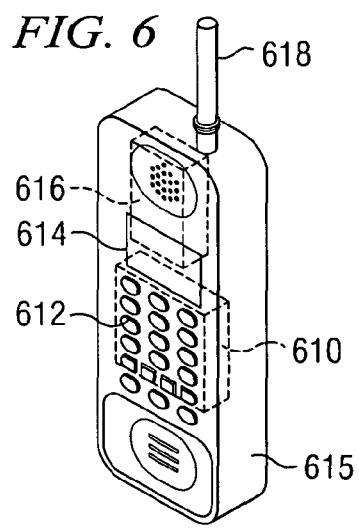
FIG. 6 depicts an illustrative embodiment of the system described herein.

System 100 may be implemented as a mobile device 615 such as that shown in FIG. 6. As shown, the mobile device 615 includes an integrated keypad 612 and display 614. The JSM processor 102 and MPU processor 104 and other components may be included in electronics package 610 connected to the keypad 612, display 614, and radio frequency ("RF") circuitry 616. The RF circuitry 616 may be connected to an antenna 618.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A computer system, comprising
a Java execution flow class that represents an execution flow context, the execution flow class defining an execution flow execution method and a constructor that creates an execution flow context;
an execution flow scheduler comprising a Java native execution flow activation method, wherein the execution flow activation method causes a context switch to an execution flow context specified when the execution flow activation method is invoked;
a Java virtual machine executable on a processor of the computer system;
a Java scheduler executable on the Java virtual machine; and
a Java thread class that extends the execution flow class, wherein the Java thread class defines an execution flow execution method that overrides the execution flow execution method of the execution flow class,
wherein a thread object comprising one or more instructions of a thread is instantiated using a custom thread class that extends the Java thread class, the constructor creates an execution flow context for the thread, and the Java scheduler invokes the execution flow activation method to switch to the thread execution flow context.

2. The system of claim 1, wherein the Java virtual machine invokes the execution flow execution method of the Java thread class to initiate execution of the one or more instructions.

3. The system of claim 1, wherein the custom thread class defines an execution flow execution method comprising the one or more instructions that overrides the execution flow execution method of the Java thread class.

4. The system of claim 3, wherein the Java virtual machine invokes the execution flow execution method of the custom thread class to initiate execution of the one or more instructions.

5. The system of claim 1, wherein the Java thread class defines a scheduling method comprising one or more instructions to invoke the execution flow activation method, and the Java scheduler invokes the scheduling method to invoke the execution flow activation method.

6. The system of claim 1, wherein the execution flow class defines a native execution flow creation method, and the constructor invokes the native execution flow creation method to create the execution flow context.

7. The system of claim 1, wherein the execution flow class defines a native execution flow destruction method, and the Java scheduler invokes the native execution flow destruction method after the one or more instructions are executed to indicate that the execution flow context is no longer in use.

8. The system of claim 1, wherein
the execution flow class defines a monitor enter method comprising one or more instructions to notify the Java scheduler to halt execution of the thread because a monitor is taken, and a monitor exit method comprising one or more instructions to notify the Java scheduler that the monitor is released, and
the one or more instructions further comprise one or more synchronized instructions, wherein the Java virtual machine invokes the monitor enter method before the one or more synchronized instructions are executed if the monitor is taken by another thread, and the Java virtual machine invokes the monitor exit method after the one or more synchronized instructions are executed by the thread.

9. A method for executing a thread in a Java application, the method comprising:
instantiating a thread object comprising one or more instructions of the thread using a custom thread class that extends a Java thread class that extends an execution flow class, wherein an execution flow context for the thread is created and wherein the Java thread class defines an execution flow execution method that overrides an execution flow execution method of the execution flow class; and
invoking a Java native execution flow activation method comprised in an execution flow scheduler to switch to the thread execution flow context.

10. The method of claim 9, wherein the custom thread class defines an execution flow execution method comprising the one or more instructions, the execution flow execution method overriding the execution flow execution method of the Java thread class.

11. The method of claim 9, wherein instantiating the thread object further comprises executing a constructor defined by the execution flow class that comprises one or more instructions to create the thread execution flow context.

12. The method of claim 9, wherein the thread object further comprises a scheduling method defined in the Java thread class, the scheduling method comprising one or more instructions to invoke the execution flow activation method, and wherein invoking the Java native execution flow activation method further comprises invoking the scheduling method by a Java scheduler.

13. The method of claim 9, further comprising destroying the thread object after the one or more instructions are executed.

14. The method of claim 13, wherein destroying the thread object further comprises executing a native execution flow destruction method defined by the execution flow class that comprises one or more instructions to indicate that the execution flow context is no longer used.

15. The method of claim 9, further comprising:
invoking a monitor enter method before one or more synchronized instructions comprised in the one or more instructions is executed if a monitor of an object comprising the one or more synchronized instructions is taken; and
invoking a monitor exit method after the one or more synchronized instructions are executed,
wherein the execution flow class defines the monitor enter method comprising one or more instructions to notify the Java scheduler to halt execution of the thread because the monitor is taken, and the monitor exit method comprising one or more instructions to notify the Java scheduler that the monitor is released.

16. A computer-readable medium storing a Java software system that, when executed by a processor, performs a method for executing a thread, the method comprising:
instantiating a thread object comprising one or more instructions of the thread using a custom thread class that extends a Java thread class that extends an execution flow class, wherein an execution flow context for the thread is created and wherein the Java thread class defines an execution flow execution method that overrides an execution flow execution method of the execution flow class; and invoking a Java native execution flow activation method comprised in an execution flow scheduler to switch to the thread execution flow context.

17. The computer-readable medium of claim 16, wherein the custom thread class defines an execution flow execution method comprising the one or more instructions, the execution flow execution method overriding the execution flow execution method of the Java thread class.

18. The computer-readable medium of claim 16, wherein instantiating the thread object further comprises executing a constructor defined by the execution flow class that comprises one or more instructions to create the thread execution flow context.

19. The computer-readable medium of claim 16, wherein the thread object further comprises a scheduling method defined in the Java thread class, the scheduling method comprising one or more instructions to invoke the execution flow activation method, and wherein invoking the Java native execution flow activation method further comprises invoking the scheduling method by a Java scheduler.

20. The computer-readable medium of claim 16, wherein the method for executing a thread further comprises:

invoking a monitor enter method before one or more synchronized instructions comprised in the one or more instructions is executed if a monitor of an object comprising the one or more synchronized instructions is taken; and invoking a monitor exit method after the one or more synchronized instructions are executed, wherein the execution flow class defines the monitor enter method comprising one or more instructions to notify the Java scheduler to halt execution of the thread because the monitor is taken, and the monitor exit method comprising one or more instructions to notify the Java scheduler that the monitor is released.

21. A system, comprising:

a processor;

a Java software system configured to execute on the processor, the Java software system comprising a Java virtual machine, wherein the Java software system is configured to instantiate an object comprising one or more instructions of a thread using a custom thread class that extends a Java thread class that extends an execution flow class, wherein an execution flow context for the thread is created and wherein the Java thread class defines an execution flow execution method that overrides an execution flow execution method of the execution flow class; and to invoke a Java native execution flow activation method comprised in an execution flow scheduler to switch to the thread execution flow context.

22. The system of claim 21, wherein the custom thread class defines an execution flow execution method comprising the one or more instructions, the execution flow execution method overriding the execution flow execution method of the Java thread class.

23. The system of claim 21, wherein the Java software program is further configured to instantiate the thread object by executing a constructor defined by the execution flow class that comprises one or more instructions to create the thread execution flow context.

24. The system of claim 21, wherein the thread object further comprises a scheduling method defined in the Java thread class, the scheduling method comprising one or more instructions to invoke the execution flow activation method, and wherein the Java software system is further configured to invoke the Java native execution flow activation method by invoking the scheduling method by a Java scheduler.

25. The system of claim 21, wherein the Java software system is further configured:

to invoke a monitor enter method before one or more synchronized instructions comprised in the one or more instructions is executed if a monitor of an object comprising the one or more synchronized instructions is taken; and to invoke a monitor exit method after the one or more synchronized instructions are executed, wherein the execution flow class defines the monitor enter method comprising one or more instructions to notify the Java scheduler to halt execution of the thread because the monitor is taken, and the monitor exit method comprising one or more instructions to notify the Java scheduler that the monitor is released.

26. The system of claim 21, wherein the system comprises a mobile device.

* * * * *